United States Patent
Cui et al.

(10) Patent No.: US 12,423,313 B1
(45) Date of Patent: Sep. 23, 2025

(54) HIERARCHICAL GRAPH RETRIEVAL AUGMENTED GENERATION WITH CONTEXT EMBEDDING

(71) Applicant: Intuit Inc., Mountain View, CA (US)

(72) Inventors: Wendi Cui, Jersey City, NJ (US); Jiaxin Zhang, Mountain View, CA (US); Qi Shen, New York, NY (US); Beatrice Hendra, New York, NY (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,658

(22) Filed: Apr. 30, 2025

(51) Int. Cl.
| | |
|---|---|
| G06F 16/00 | (2019.01) |
| G06F 16/2457 | (2019.01) |
| G06F 16/901 | (2019.01) |
| G06F 16/9038 | (2019.01) |
| G06F 16/93 | (2019.01) |

(52) U.S. Cl.
CPC .... G06F 16/24578 (2019.01); G06F 16/9024 (2019.01); G06F 16/9038 (2019.01); G06F 16/93 (2019.01)

(58) Field of Classification Search
CPC ........... G06F 16/24578; G06F 16/9024; G06F 16/9038; G06F 16/93
See application file for complete search history.

(56) References Cited

U.S. PATENT DOCUMENTS

| | | | | |
|---|---|---|---|---|
| 11,941,344 | B2* | 3/2024 | Baron | G06F 40/143 |
| 12,282,504 | B1* | 4/2025 | Ganesh | G06F 16/383 |
| 12,306,842 | B1* | 5/2025 | Yates | G06N 20/00 |
| 2019/0340304 | A1* | 11/2019 | Bak | G06F 16/904 |
| 2020/0012851 | A1* | 1/2020 | Stanley | G06V 30/418 |
| 2023/0093929 | A1* | 3/2023 | Wong | G06F 3/0486 |
| | | | | 715/769 |
| 2024/0338378 | A1* | 10/2024 | Setlur | G06F 16/243 |
| 2024/0386015 | A1* | 11/2024 | Crabtree | G06F 16/9024 |
| 2025/0131001 | A1* | 4/2025 | Yates | G06F 16/248 |

OTHER PUBLICATIONS

Sarthi, P., et al., "RAPTOR: Recursive Abstractive Processing for Tree-Organized Retrieval", Published as a conference paper at ICLR 2024, Jan. 31, 2024, 23 pages.
"Lexical Graph", Graph RAG, https://graphrag.com/reference/knowledge-graph/lexical-graph/, Mar. 18, 2025, 3 pages.
Goel, K., et al., "HIRO: Hierarchical Information Retrieval Optimization", Sep. 4, 2024, 9 pages.

* cited by examiner

Primary Examiner — Noosha Arjomandi
(74) Attorney, Agent, or Firm — Lathrop GPM LLP

(57) ABSTRACT

A method includes obtaining a hierarchical document structure of a raw document. The hierarchical document structure includes a multitude of sections arranged in a hierarchy of successive document levels. A hierarchical document graph having a graph hierarchical structure corresponding to the hierarchical document structure of the raw document is constructed. A hierarchical document graph corresponding to the raw document matching a user query is retrieved. A hierarchical search is performed on the hierarchical document graph to obtain a set of relevant nodes. A set of relevant content embeddings is retrieved from the set of relevant nodes. A large language model (LLM) generates a response to the user query from the set of relevant content embeddings. The response is presented in a user application.

16 Claims, 7 Drawing Sheets

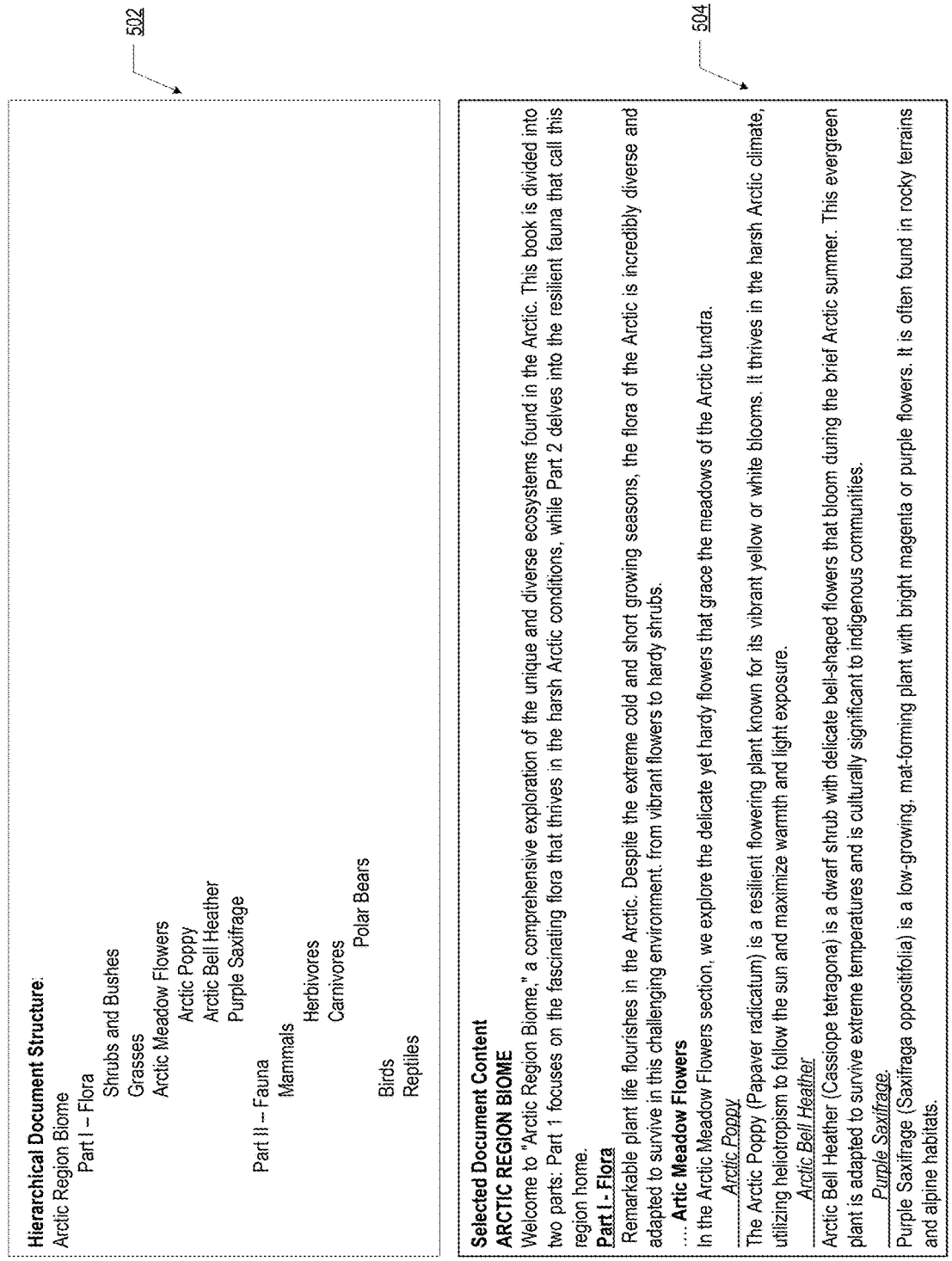

Hierarchical Document Structure:
Arctic Region Biome
    Part I -- Flora
        Shrubs and Bushes
        Grasses
        Arctic Meadow Flowers
            Arctic Poppy
            Arctic Bell Heather
            Purple Saxifrage
    Part II -- Fauna
        Mammals
            Herbivores
            Carnivores
                Polar Bears
        Birds
        Reptiles

— 502

Selected Document Content
ARCTIC REGION BIOME
Welcome to "Arctic Region Biome," a comprehensive exploration of the unique and diverse ecosystems found in the Arctic. This book is divided into two parts: Part 1 focuses on the fascinating flora that thrives in the harsh Arctic conditions, while Part 2 delves into the resilient fauna that call this region home.
Part I - Flora
Remarkable plant life flourishes in the Arctic. Despite the extreme cold and short growing seasons, the flora of the Arctic is incredibly diverse and adapted to survive in this challenging environment. from vibrant flowers to hardy shrubs.
.... Artic Meadow Flowers
In the Arctic Meadow Flowers section, we explore the delicate yet hardy flowers that grace the meadows of the Arctic tundra.
    *Arctic Poppy*
The Arctic Poppy (Papaver radicatum) is a resilient flowering plant known for its vibrant yellow or white blooms. It thrives in the harsh Arctic climate, utilizing heliotropism to follow the sun and maximize warmth and light exposure.
    *Arctic Bell Heather*
Arctic Bell Heather (Cassiope tetragona) is a dwarf shrub with delicate bell-shaped flowers that bloom during the brief Arctic summer. This evergreen plant is adapted to survive extreme temperatures and is culturally significant to indigenous communities.
    *Purple Saxifrage*
Purple Saxifrage (Saxifraga oppositifolia) is a low-growing, mat-forming plant with bright magenta or purple flowers. It is often found in rocky terrains and alpine habitats.

HIERARCHICAL GRAPH RETRIEVAL AUGMENTED GENERATION WITH CONTEXT EMBEDDING

BACKGROUND

Retrieval augmented generation (RAG) is a method that enhances the capabilities of large language models (LLMs). RAG entails integrating content from external knowledge sources, such as documents, databases, knowledge graphs, and webpages with the capabilities of LLMs in the process of answer generation. This approach causes LLMs to handle complex queries and generate responses that are not only based on their training data but also enriched with up-to-date and specific information from external sources. RAG methods may entail the use of diverse techniques for document or information retrieval and representation in a form searchable and understandable by LLMs. Graph retrieval augmented generation (graph-RAG) uses knowledge graphs generated from raw documents/data. The knowledge graphs model the relationships and hierarchies within the data. At query time, the knowledge graphs are used to augment the prompts given to the LLM, enhancing the LLMs ability to answer complex questions.

Graph building methods may entail the extraction of entities like names, dates, concepts, etc., and building the graph based on these entities. The internal structure and relationships within the document are not captured. Thus, searching the document does not consider the internal structure of the document leading to search engines that does suboptimal searches of documents.

SUMMARY

In general, in one aspect, one or more embodiments relate to a method. The method includes obtaining a hierarchical document structure of a raw document. The hierarchical document structure includes a multitude of sections arranged in a hierarchy of successive document levels. The method further includes constructing a hierarchical document graph having a graph hierarchical structure corresponding to the hierarchical document structure of the raw document in a physical storage device. The method further includes retrieving, responsive to a user query, the hierarchical document graph corresponding to the raw document matching the user query. The method further includes performing a hierarchical search operation on the at least one hierarchical document graph using a user query embedding of the user query, to obtain a set of relevant nodes of the hierarchical document graph. The method further includes retrieving a set of relevant content embeddings for the set of relevant nodes. The method further includes generating, by a large language model (LLM), a response to the user query from the set of relevant content embeddings. The method further includes presenting the response in a user interface (UI) of a user application.

In general, in one aspect, one or more embodiments relate to a system. The system includes at least one computer processor, a physical storage device, and a document graph builder, executing on the at least one computer processor. The document graph builder is configured to perform operations including obtaining a raw document from a data repository, having a hierarchical document structure including a multitude of sections arranged in a hierarchy of successive document levels. The operations further include constructing a hierarchical document graph having a graph hierarchical structure corresponding to the hierarchical document structure of the raw document in a physical storage device. The system further includes a document retriever executing on at least one computer processor and configured to retrieve at least one hierarchical document graph corresponding to at least one raw document matching a semantic intent of a user query. The system further includes a search agent, executing on the at least one computer processor and configured to perform a hierarchical search operation on the at least one hierarchical document graph of a user query embedding of the user query, to obtain a set of relevant nodes of the at least one hierarchical document graph. The system further includes an embedding model, executing on the at least one computer processor and configured to retrieve a set of relevant content embeddings corresponding to the set of relevant nodes. The system further includes an LLM, executing on the at least one computer processor for generating a response to the user query from the set of relevant content embeddings. The system is further configured to present the response in a user interface of the user application.

In general, in one aspect, one or more embodiments relate to a method. The method includes obtaining a raw document from a data repository, having a hierarchical document structure. The hierarchical document structure includes a multitude of sections arranged in a hierarchy of successive document levels. The method further includes extracting the document hierarchy structure from the raw document. The method further includes initializing a hierarchical document graph in a physical storage device by adding a root node in a root storage location. The root node includes a root node identifier as a document identifier of the raw document. The method further includes adding first level section nodes in first individual corresponding storage locations to the hierarchical document graph, corresponding to respective first level sections of a first level of the hierarchical document structure. The method further includes connecting the root node to the first level section nodes by adding respective first storage references corresponding to the first individual corresponding storage locations to the root node. Responsive to a first level section of the first level of the hierarchical document structure including a multitude of second level sections corresponding to a second level of the document hierarchical structure, the method further includes adding second section level nodes in second individual corresponding storage locations to the hierarchical document graph, corresponding to respective second level sections of the multitude of second level sections. The method further includes connecting a first level section node of the hierarchical document graph corresponding to the first level section to the second section level nodes by adding respective second storage references corresponding to the second individual corresponding storage locations to the first level section node. The method further includes adding context embeddings to a multitude of nodes of the hierarchical document graph by generating a context embedding of a context path of an individual node of the multitude of nodes of the hierarchical document graph. The context path includes node identifiers of nodes included in a graph traversal path from a root node of the hierarchical document graph up to the individual node, and node identifiers of child nodes of the individual node. The method further includes adding the context embedding to the individual node. The method further includes adding property embeddings to the multitude of nodes of the hierarchical document graph by generating a set of property embeddings for the individual node, including property embeddings corresponding to the nodes included in the graph traversal path from the root node to the individual node, and a property embedding corresponding to a property of the individual node. The method further includes adding the set of property embeddings to the individual node.

Other aspects of one or more embodiments will be apparent from the following description and the appended claims.

BRIEF DESCRIPTION OF DRAWINGS

FIG. 5 shows an example of a hierarchical document structure, in accordance with one or more embodiments.

Like elements in the various figures are denoted by like reference numerals for consistency.

DETAILED DESCRIPTION

One or more embodiments are directed to providing a robust search agent that creates and leverages hierarchical document graphs for raw documents with inherent hierarchical structure. The search agent is an artificial intelligence (AI) agent that functions as a search engine. The hierarchical document graph structure may mirror the hierarchical structure of the document, preserving the logical flow of sections and subsections. The hierarchical document graph includes a multitude of nodes, interconnected by edges in a hierarchical arrangement that mirrors the hierarchical structure of the raw document. Further, the nodes of the hierarchical document graph may be embedded with contextual information, inherited, or propagated from parent and/or ancestor nodes, and direct child nodes. The nodes of the hierarchical document graph may represent the sections and subsections of the document, and the content within the sections. Further, the nodes may include certain vector embeddings of properties of semantic significance that may be inherited from parent and ancestor nodes. Additionally, the nodes may include context embeddings. Context embeddings are vector embeddings of context paths. Context paths are node identifiers of sequences of nodes encountered in a graph traversal path from the root node of the hierarchical document graph to a particular node. Context paths may additionally include node identifiers of direct child nodes of a particular node.

When the hierarchical document graph is searched using graph search methods, relevant nodes are selected based on similarity of the context embeddings, and/or property embeddings of the nodes to the user query. When a set of relevant nodes are selected, the content from the nodes is retrieved and ranked to surface the most relevant passages. The relevant passages are passed to the LLM for final answer generation.

Figure 1:
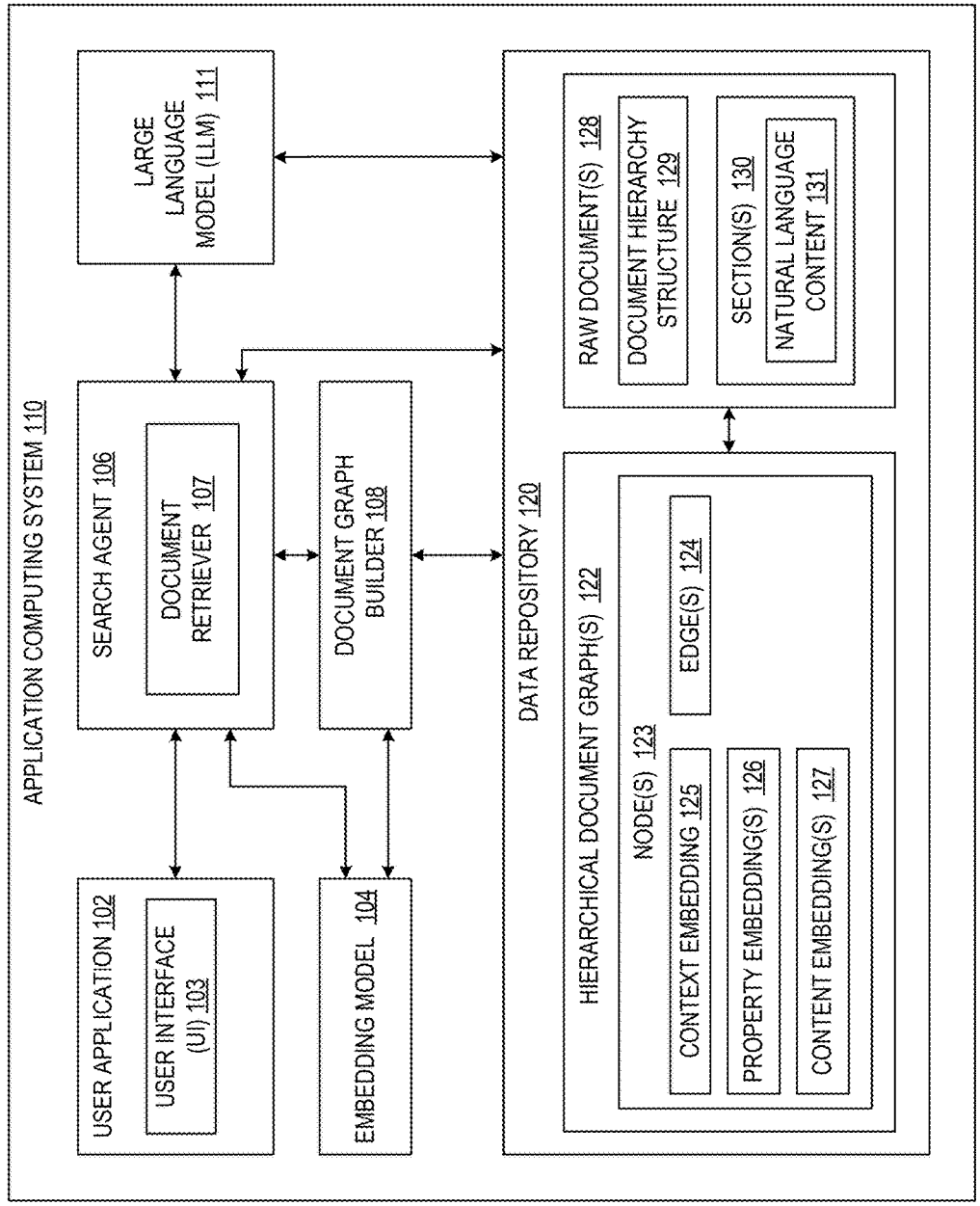
FIG. 1 shows a computing system, in accordance with one or more embodiments.

Attention is now turned to the figures. FIG. 1 shows a computing system, in accordance with one or more embodiments. The system shown in FIG. 1 may include an application computing system (110). The application computing system (110) is one or more computer processors, memories, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the user application (102), the embedding model (104), the search agent (106), the document graph builder (108), or the LLM (111). An example of the computer processor is described with respect to the computer processor(s) (702) of FIG. 7A. Thus, the application computing system (110) is configured to execute one or more applications, such as the user application (102), the embedding model (104), the search agent (106), the document graph builder (108), or the LLM (111). An example of a computer system and network that may form the application computing system (110) is described with respect to FIG. 7A and FIG. 7B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes a corpus of raw document(s) (128). The raw documents may be documents pertaining to one or more particular domains of the user application (102). In certain embodiments, the corpus of raw documents (s) (128) may constitute documents of the enterprise hosting the application computing system (110), which may be proprietary and/or not publicly available. More particularly, the LLM (111) may not be pre-trained with the raw document(s) (128), and may use content obtained from the raw document(s) (128) for RAG.

A raw document (128) may further include a document hierarchy structure (129). The document hierarchy structure (129) refers to a logical and/or semantic organization of the content of the raw document (128). The document hierarchy structure (129) may be similar in organization to a table of contents of the raw document (128). Thus, the document hierarchy structure (129) may include one or more chapters, sections, subsections, etc. The document hierarchy structure (129) defines the logical and semantic hierarchy of various sections of the document. Thus, the document hierarchy structure (129) may include one or more chapters. The chapters each may include one or more sections. The sections each may include one or more subsections, etc. In one or more embodiments, the document hierarchy structure (129) may include identifiers (names, or titles) of the various chapters, sections, subsections etc. of the raw document. As used in the current specification, the collective term used for the various chapters, parts, appendices, sections and subsections of a document is "sections." Thus, a section of a document may be a chapter. A section may also be a section within a chapter, a subsection within a section, etc.

The document hierarchy structure (129) may be organized as a multi-level hierarchy of section identifiers. Each level may represent a different granularity of content. A first level in the document hierarchy structure may include section identifiers for the broadest divisions of the document, namely, chapters, or parts. From a logical or semantic perspective, chapters or parts may be independent of one another, but collectively contribute to the overall structure and flow of the document. A second level in the document hierarchy structure (129) may include section identifiers under each of the first level section identifiers. From the logical/semantic perspective, the second level may include the section identifiers of sections nested within the first level chapters/parts. Further, the second level sections may provide detailed exploration of the themes introduced in the first level chapters/parts. A third level in the document hierarchy structure (129) may include subsection identifiers for subsections under each of the second level section identifiers. From the logical/semantic perspective, subsections are nested within sections. Subsections may offer further detailed information on specific aspects of an enclosing section's topic. Subsections may be composed of further subsections, or of natural language paragraphs.

Thus, the section identifiers at each level are nested within the level above, creating a structured and organized flow of information. In this manner, the hierarchy captures the logical progression of ideas, from broad themes (chapters) to specific details (paragraphs and sentences/words). The document hierarchy structure (129) may be stored as Javascript Object Notation (JSON) documents, eXtensible Markup Language (XML) documents, etc.

The raw document (128) may further include one or more section(s) (130), corresponding to the respective sections of the document hierarchy structure. A section (130) may include free-standing content, shown in FIG. 1 as natural language content (131). Free-standing content of a section refers to natural language content of a section that is not organized under a subsection of the section. For example, a raw document may include information about flora and fauna of the arctic region, titled "Arctic Region Biome." The raw document may include two parts, "Part I—Flora" and "Part II—Fauna." When reading the document, either by a machine or a human, Part I—Flora may include one or two introductory paragraphs, before the sections of Part I—Flora are encountered, for example "Shrubs and Bushes," "Grasses," "Arctic Meadow Flowers," etc. The one or two introductory paragraphs may be referred to as free-standing content. Further, the section Arctic Meadow Flowers may have subsections "Arctic Poppy," "Arctic Bell Heather," "Purple Saxifrage," and other subsections, but no free-standing content. In this case, the section may only include the section identifier, namely, "Arctic Meadow Flowers," and no natural language content. Furthermore, the content of the "Arctic Poppy" subsection may include one or more paragraphs describing the Arctic Poppy. However, no further subsections may be encountered. In this case, the section for "Arctic Poppy" may include the section identifier, namely, "Arctic Poppy" and the one or more paragraphs describing the Arctic Poppy. Thus, the sections (130) of the raw document may include the free-standing content of each section, namely, the natural language content (131). Examples of storage for the sections (130) of the raw document (128) may include key-value pairs, with a key as the section identifier and the value as the free-standing content.

The data repository (120) further includes one or more hierarchical document graphs (122). A hierarchical document graph (122) corresponds to a raw document (128). The hierarchical document graph (122) of a raw document (128) is a logical, and machine-processable representation of the raw document (128). The hierarchical document graph (122) is a representation of the raw document's (128) structure and content, organized into a tree-like structure. The tree-like structure includes nodes and edges. Each node may represent a specific section (such as chapters, sections, and subsections). Edges of the hierarchical document graph may interconnect the nodes in a hierarchical relationship. The nodes of the hierarchical document graph may be organized in levels, or layers. Each level may represent a different rank. The hierarchical document graph (122) models the parent-child relationships of the raw document (128) sections.

The hierarchical document graph (122) includes one or more node(s) (123). A node in the hierarchical document graph (122) represents an individual section of the raw document (128) within the hierarchical graph. A node (123) may have one or more edges (124). The edges (124) interconnect the nodes (123) in parent-child logical relationships. The edges (124) may be unidirectional, connecting parent nodes to child nodes. In one or more embodiments, in the hierarchical document graph (122), a "parent" node may be a node that connects to one or more child nodes. That is, a one-to-many relationship may exist between a parent node and one or more child nodes. Notably conversely, a many-to-one relationship may exist between one or more child nodes and a parent node. Thus, a parent node may include one or more edges (124) connecting the parent node to one or more child nodes. However, no two parent nodes may be connected to the same child node. Other embodiments may be possible, for example, some of the edges (124) may connect child nodes to their respective parent nodes.

Additionally, the topmost node in the hierarchy, which does not have a parent, may be referred to as a "root" node. The root node may be at a top level of the hierarchy. Further, a node that does not have any child nodes may be referred to as a "leaf" node. Leaf nodes may be at a bottom level of the hierarchy. Nodes in the levels between the top level and the bottom level may be parent nodes and child nodes simultaneously.

For example, let A be a raw document, with chapters B1, B2, and B3. Let chapter B3 have sections C1 and C2. A hierarchical document graph may be generated corresponding to the raw document A. The hierarchical document graph may include a root node A, representative of the raw document A. Root node A may be a parent node to nodes {B1, B2, B3}. The interconnection between root node A and the nodes {B1, B2, B3} models the relationship of raw document A having chapters B1, B2, and B3. The node B3, may in turn, be a parent node to nodes {C1, C2}. The interconnection between B3 and {C1, C2} models the relationship of chapter B1 having sections C1 and C2. Notably, the node B3 is a "child node" of the root node A, and simultaneously, a "parent" node of {C1, C2}. In the hierarchical document graph (122) for document A, node B3 may have two edges connecting B3 to C1 and C2 respectively. An example of a hierarchical document graph (122) is shown and described in detail in reference to FIG. 4.

The node(s) (123) of the hierarchical document graph (122) further include diverse embeddings. The embeddings of a node (123) may include context embeddings (125), property embeddings (126), and content embeddings (127). The context embedding (125) of a node (123) is a vector embedding of a context path of the node (123). The context path of a particular node (123) refers to a string of node identifiers that are encountered in a graph traversal from the root node to the particular node. From the current example, the context path of node C2 may be "A-B3-C2." From the previous example of "Arctic Region Biome," the context path for the node "Arctic Poppy" may be "Arctic Region Biome-Part I—Flora—Arctic Meadow Flowers—Arctic Poppy." Additionally, if the particular node is connected to one or more child nodes, the context path may further include node identifiers of the one or more child nodes. With the inclusion of the context embedding for the context path of the particular node, the context path is rendered searchable for semantic searches and natural language processing tasks. With the inclusion of the node identifiers of the child nodes, the context path serves as an indicator for the child node to traverse, when being searched for content retrieval to serve a search query. From the previous example of "Arctic Region Biome," the context path for the node "Arctic Meadow Flowers" may be "Arctic Region Biome-Part I—Flora—Arctic Meadow Flowers—Arctic Poppy," and/or "Arctic Region Biome-Part I—Flora—Arctic Meadow Flowers—Arctic Bell Heather," and/or Arctic Region Biome-Part I—Flora—Arctic Meadow Flowers—Purple Saxifrage."

The property embedding (126) of a node (123) refers to a list of vector embeddings, corresponding to selected properties of nodes. The nodes may be encountered in a graph traversal from the root node to the particular node (123). Certain nodes encountered in a graph traversal may include additional context, referred to as properties, in addition to the context path of the certain nodes. These properties may be deemed to have semantic significance to the context of nodes in the particular graph traversal path. The properties of semantic significance may be propagated from parent to child in the graph traversal path of the particular node (123). For example, in a raw document, chapters, sections, and subsections may have content variations corresponding to respective time periods. A section may include content corresponding to "pre-America Invents Act (AIA)." The same section may include content corresponding to "AIA." In other words, the diverse content corresponding to the diverse time periods may not be distinguishable by being organized under different subsections. Instead, the content may need to be machine-read or manually read to understand the variations between the time periods. Thus, the properties of "pre-AIA" and "AIA" may be deemed to have semantic significance to the content of the sections of the document. The properties of nodes that are to be propagated may vary for different domains, and use cases of applications.

Graph traversal refers to the process of visiting a sequence of nodes within a graph, starting from a designated root node and moving through intermediate nodes to reach a specific target node. A graph traversal path refers to the sequence of nodes encountered when moving from one node to another node along an edge interconnecting the two nodes within a graph. The graph traversal path outlines the specific route taken to reach a particular node, starting from a (designated) root node. For example, in a hierarchical graph, the traversal path from the root node to a given node includes all intermediate nodes encountered along the way. The traversal path may be represented as a sequence of nodes, such as A→B→C→D, where A is the root node, B and C are intermediate nodes, and D is the target node.

Continuing with the previous example, when generating the document hierarchical graph corresponding to the particular document, the properties "pre-AIA" and "AIA" may be added as property embeddings to nodes of the document hierarchical graph. By way of example, let root node A be connected to child nodes {B1, B2, B3}. Let B3 be connected to child nodes {C1, C2}. Let the root node A have the properties "pre-AIA" and "AIA." Vector embeddings for "pre-AIA" and "AIA" may be generated and added to root node A as the property embeddings of root node A. Further, the property embeddings may be propagated from A to {B1, B2, B3} and further to {C1, C2}. Thus, the nodes {B1, B2, B3} may include the property embeddings for "pre-AIA" and "AIA," inherited from root node A. In a similar manner, the nodes {C1, C2} may also include the property embeddings for "pre-AIA" and "AIA," inherited from node B2.

Determining a property of semantic significance of a particular node may be a manual and/or machine process. Further, a property of semantic significance may be determined for a first node at the top level, or any intermediate level of the document hierarchical graph. The property for the first node may be propagated to the child nodes of the first node. In certain cases, a second property of semantic significance may be identified for a first child node of the first node. In this case, the second property may be added to the property(ies) "inherited" from the first node by the first child node. The augmented list of properties of the first child node may be propagated to child nodes of the first child node. By way of example, let A be a root node. Let A be connected to {B1, B2, B3}. Let B2 be connected to {C1, C2, C3}. Let C2 be connected to D1, and C3 be connected to D2. Let B2 have a property PB2. PB2 is propagated to {C1, C2, C3}. Let C3 have a property PC3. Then the properties for {C1, C2, C3} are {PB2, PB2, {PB2, PC3}}. The properties for D1, inherited from C2, are {PB2}. The properties for D2, inherited from C3, are {PB2, PC3}.

The content embedding (127) of the node (123) is a vector embedding of the free-standing content of the section in the raw document to which the node corresponds. For example, a hierarchical document graph (122) may be generated for the raw document titled "Arctic Region Biome." In the hierarchical document graph, a node corresponding to the section "Arctic Poppy" in the raw document may have a content embedding (127) that is a vector embedding of the natural language content (131) of the section (130) named "Arctic Poppy" in the raw document (128).

The hierarchical document graph (122) of a raw document (128) may be stored in physical storage. The hierarchical document graph (122) may be loaded from physical storage into the memory of the application computing system (110) for content search and retrieval. The hierarchical document graph (122) may be loaded into a multitude of memory locations. Each node (123) of the hierarchical document graph (122) may occupy a specific portion of memory. That is, each node (123) of the hierarchical document graph (122) may be allocated with one or more distinct memory locations. The distinct memory locations are referenced by storage references. Storage references are the memory addresses of the distinct memory locations. The distinct memory location(s) allocated to a node may contain the various embeddings of the node (123), and storage references of child nodes of the node. Each child node, in turn, may occupy respective distinct portions of memory including one or more distinct memory locations. This structure may continue recursively, with each node pointing to its child nodes, creating a tree-like hierarchy in memory. Further, the references of a node may represent the edges (124) of the node (123).

A storage reference to a memory location is the logical address of the memory location in the memory map of a computing system. The memory map of the computing system may map the logical address to a physical address. The physical address is the actual address in the computer's physical memory (RAM). For instance, the root node of the hierarchical document graph (122) may be stored at a particular physical memory allocation. The reference to the root node, usable in programs that access and manipulate the root node, may be a logical address of the location of the root node. When the reference to the root node is accessed in computer program code, the computer processor may use the memory map to retrieve the data at the physical memory location where the root node is stored.

The application computing system (110) further includes a search agent (106). The search agent (106) is software or application specific hardware which, when executed by the computer processor, essentially performs the method of FIG. 2. In one or more embodiments, the search agent may be an artificial intelligence (AI) agent that uses the LLM (111) as a central computational engine. An AI agent that uses an LLM combines the natural language processing capability of the LLM with decision-making, planning, and tool-usage capabilities to autonomously execute complex tasks. The AI agent may comprehend and process natural language inputs, making it capable of understanding user queries and instructions. AI agents may be configured to reason through problems of specific domains, create plans to solve them, and adjust their approach based on feedback or changing conditions. AI agents may further be configured to perform actions using various tools, such as web searches, database queries, or API calls, to gather real-time information and execute tasks. Additionally, AI agents may retain information from past interactions, to inform the generation of personalized responses and for continuous learning.

The search agent (106) further includes a document retriever (107). The document retriever (107) is software or application specific hardware which, when executed by the computer processor, essentially performs the method of FIG. 4. The document retriever (107) is configured to load a hierarchical document graph (122) of a raw document (128) into memory and perform a graph search to retrieve content that is semantically similar to a user query. The graph search may be based on one or more graph search algorithms, such as beam search, breadth-first search, and depth-first search. The graph search algorithms may leverage the hierarchical structure of the hierarchical document graph (122) to prioritize searching within specific sections before moving to others, reducing unnecessary computations. Maintaining the hierarchical context may ensure that the search results are relevant and coherent, preserving the logical flow of the document.

For instance, in the beam search algorithm, a predetermined number of the most promising nodes based on cosine similarity between the context embedding and the user query embedding may be expanded at each level of the hierarchy. The selective traversal may facilitate efficient navigation of hierarchical graph representations of large, structured documents. By limiting the number of nodes expanded (beam width), the beam search algorithm may focus on the most relevant parts of the hierarchy, reducing computational overhead. Further, the beam search algorithm may comply with memory constraints by keeping only a limited set of nodes at each level, facilitating efficient traversal of large hierarchical graphs. Less promising nodes are "pruned" to manage the search space and focus on the most relevant paths.

The application computing system (110) further includes a document graph builder (108). The document graph builder (108) is software or application specific hardware which, when executed by the computer processor, essentially performs the method of FIG. 3. The document graph builder (108) may be configured to generate a hierarchical document graph (122) from a raw document (128) in a graph-generation phase of the application computing system, prior to the deployment of the application computing system. Further the document graph builder (108) may be configured to execute as a background process, generating and updating hierarchical document graphs corresponding to new and updated structured raw documents that are loaded into the data repository (120). The generation of a hierarchical document graph (122) from a raw document (128) is described in further detail in reference to FIG. 3.

The application computing system (110) may further include an embedding model (104). The embedding model (104) is a type of machine learning model used to transform high-dimensional data into lower-dimensional vectors, known as embeddings. The embeddings capture the essential features and relationships of the data facilitating semantic analysis and use in various applications. Embedding models may reduce the complexity of data by mapping it to a lower-dimensional space while preserving important relationships and structures. Each data point (e.g., word, sentence, image) may be represented as a vector in the lower-dimensional space. The vectors may be used for various tasks like similarity measurement, clustering, and classification. In natural language processing applications, word embeddings represent words in a continuous vector space, capturing semantic relationships. Embedding models may be trained on large datasets to learn the mapping from high-dimensional data to lower-dimensional vectors. Once trained, the embedding model may generate embeddings for new data points, which may then be used in downstream tasks like search, clustering, or prediction. Embedding models may have diverse machine learning model architectures, such as shallow neural networks for generating word associations from large text corpora (e.g., Word2Vec©, GloVe®, etc.). Convolutional neural networks (CNNs) may be used for generating image embeddings. Transformer architecture-based models (e.g., Bidirectional Encoder Representations from Transformers (BERT)) may generate contextual embeddings for words and sentences.

The application computing system (110) may further include an LLM (111). The LLM (111) is a type of AI model designed to understand and generate human-like text based on vast amounts of data. The LLM (111) may have a transformer model architecture. LLMs are trained on extensive datasets containing text from books, articles, websites, and other sources to predict and generate coherent and contextually relevant text. LLMs are characterized by vast numbers of training parameters (often billions), that have the capacity to capture complex language patterns and nuances. As a result, LLMs may understand and generate text that is contextually appropriate. Thus, LLMs may perform various language-related tasks, including translation, summarization, question answering, and text generation. Examples of LLMs include Generative Pre-trained Transformer (GPT) developed by OpenAI®, BERT developed by Google®, etc.

The application computing system (110) includes a user application (102). The user application (140) is software or application-specific hardware that may be used by a user to submit a user query. In one or more embodiments, the user application (102) may be a web-based client application, operating within a web browser. Other embodiments of the user application (102) may include native desktop applications, mobile applications, remote desktop clients, etc. The user application (102) may include a user interface (UI) (103). In one or more embodiments, the UI (103) may be a web interface, or mobile application interface. The user application (102) may be an office productivity based application (e.g., Office 365®), a graphics based application, a financial application (e.g., TurboTax®), a multi-media application, or other type of agentic application, such as an intelligent assistant (e.g., chatbots, co-pilots, etc.). The search agent (106) may be configured to receive user queries from the user application (102) and obtain corresponding user query embeddings by processing the user query by the embedding model (104).

The machine learning models used by the application computing system (110) may include neural networks and may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classification, principal component analysis, gradient boosting, etc.

The machine learning models may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

While FIG. 1 shows a configuration of components, other configurations may be used without departing from the scope of one or more embodiments. For example, various components may be combined to create a single component. As another example, the functionality performed by a single component may be performed by two or more components.

Figure 2:
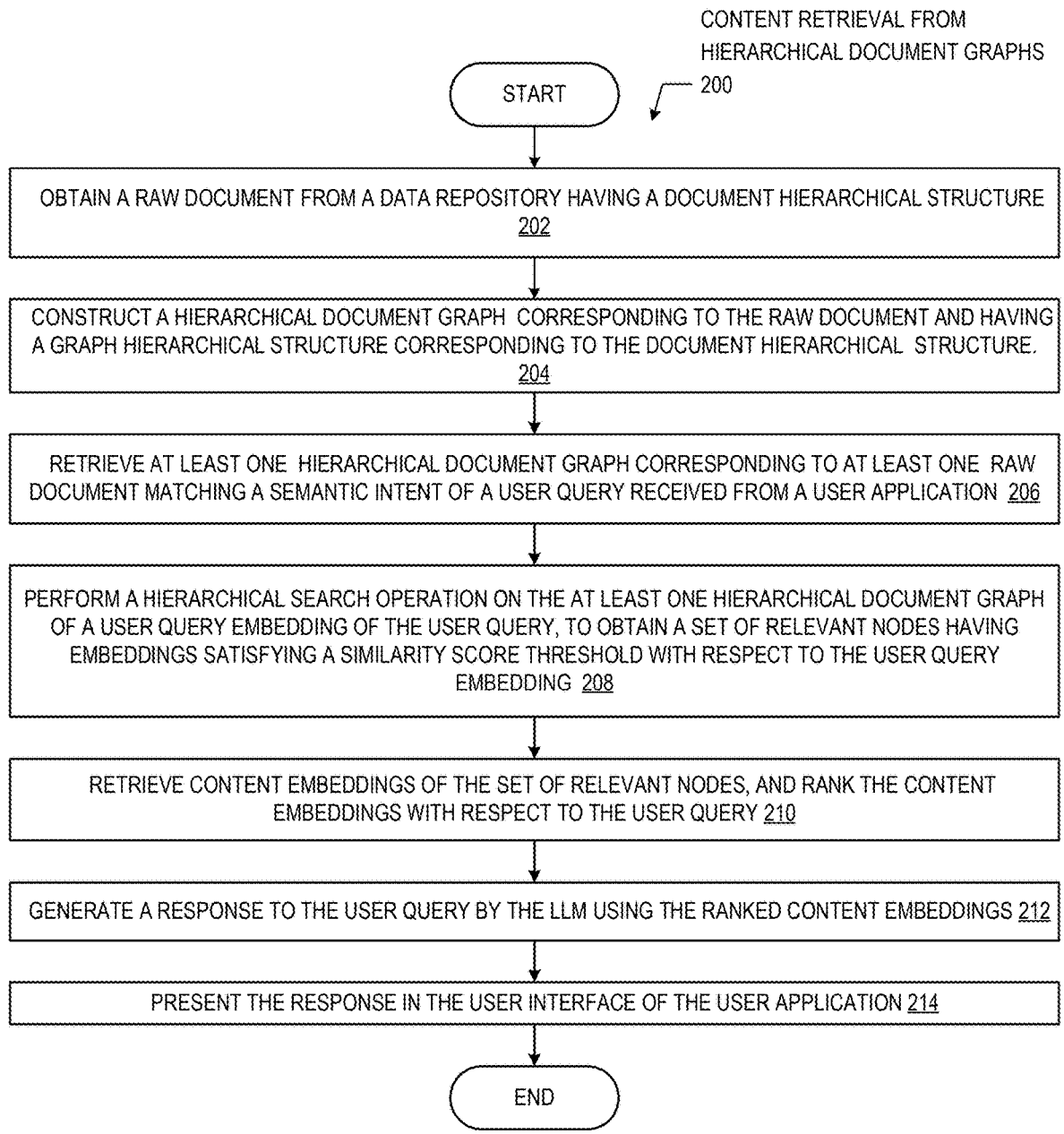
FIG. 2 shows a flowchart of a method for content retrieval from hierarchical document graphs, in accordance with one or more embodiments.

FIG. 2 shows a flowchart 200 of a method for construction of and content retrieval from hierarchical document graphs for RAG, in accordance with one or more embodiments. The method of FIG. 2 may be implemented using the system of FIG. 1 and one or more of the steps may be performed on or received at one or more computer processors. While the various steps in flowchart 200 are presented and described sequentially, at least some of the steps may be executed in different orders, may be combined or omitted, and at least some of the steps may be executed in parallel. Furthermore, the steps may be performed actively or passively.

Blocks 202 and 204 of the flowchart 200, may entail the construction of document hierarchical graphs corresponding to the raw documents in the data repository of the application computing system. Thus, Blocks 202 and 204 may be considered as a building phase of the flowchart 200.

Accordingly, in Block 202, a raw document is obtained from a data repository. The raw document may have a document hierarchical structure including a multitude of sections arranged in a hierarchy of successive document levels.

In Block 204, a hierarchical document graph is constructed. The hierarchical document graph corresponds to the raw document. Further, the hierarchical document graph has a graph hierarchical structure corresponding to the document hierarchical structure. In one or more embodiments, the graph hierarchical structure includes a multitude of nodes corresponding to the multitude of sections. The multitude of nodes is arranged in a hierarchy of successive graph levels corresponding to the hierarchy of successive document levels. A multitude of hierarchical document graphs corresponding to a multitude of raw documents may be obtained in this manner. The hierarchical document graph may be constructed in a physical storage device, accessible by the at least one computer processor. The physical storage device may include the physical memory of the application computing system. In one or more embodiments, the document graph builder of FIG. 1 may be programmatically invoked to generate the hierarchical document graphs. In one or more embodiments, the graph hierarchical structure may include the multitude of nodes interconnected by a multitude of edges. Further, the multitude of nodes may respectively include a content embedding, a context embedding, and a property embedding.

In one or more embodiments, the hierarchical document graph may include a top level. The top level may include a root node. Further, the hierarchical document graph may include at least a first level. The first level may include one or more first nodes. The root node may be connected to the one or more first nodes as a parent node of the first nodes. Furthermore, the hierarchical document graph may include a second level. The second level may include one or more second nodes. Individual nodes of the first nodes may be mutually exclusively connected to the one or more second nodes, as parent nodes of the second nodes. A detailed description of building the hierarchical document graph is provided in reference to the method of FIG. 3.

Blocks 206-214 of the flowchart 200 entail the steps of performing a document search for content to generate a response to a user query, using a corresponding hierarchical document graph representation of relevant documents.

Accordingly, in Block 206, at least one hierarchical document graph corresponding to at least one raw document matching a semantic intent of a user query is retrieved. In one or more embodiments, the user query may be received from a user application. In one or more embodiments, the search agent of FIG. 1 may prompt the LLM of FIG. 1, providing the user query as input, with instruction(s) to determine the semantic intent of the user query. Further, the determined semantic intent of the user query may be used to identify potential raw documents that may be used to generate an accurate and relevant response to the user query.

The semantic intent of the user query refers to the inferred meaning and objective of the query, derived from its linguistic and contextual elements. In the context of RAG-based LLM response generation, the semantic intent may be used to identify and retrieve the most relevant documents from a data repository, for answer generation. For example, if a user query is "What are the health benefits of green tea?", the semantic intent may be to obtain information about the positive effects of green tea on an individual's health. The LLM may use this intent to identify raw documents related to health benefits associated with green tea.

In Block 208, a hierarchical search operation is performed on the at least one hierarchical document graph of a user query embedding of the user query, to obtain a set of relevant nodes of the at least one hierarchical document graph. The set of relevant nodes may have embeddings satisfying a similarity score threshold with respect to the user query embedding. More particularly, the set of relevant nodes respectively include at least a relevant context embedding and a relevant property embeddings. The respective relevant context embedding, and the relevant property embeddings may satisfy a similarity score threshold with respect to the user query embedding. In one or more embodiments, the search agent of FIG. 1 may invoke the document retriever to retrieve the hierarchical document graph(s) corresponding to the raw document(s) identified by the large language model (LLM). The raw documents identified by the LLM may be potentially relevant to the semantic intent of the user query. The hierarchical search operation is described in further detail in reference to FIG. 4.

The similarity score threshold refers to a threshold value of a measure of similarity between the context and/or property embeddings and the user query embedding. In one or more embodiments, the measure of similarity may be a value obtained by calculating a cosine similarity between a context and/or property embedding and the user query embedding. Cosine similarity is a measure used to determine how similar two vectors (or embeddings) are, regardless of their magnitude. A cosine similarity function may calculate the cosine of the angle between the two vectors, to obtain a value between −1 and 1. A value of 1 may indicate that the vectors are identical. A value of 0 may indicate that the vectors are orthogonal (completely dissimilar), and −1 may indicate that the vectors are diametrically opposed. Other similarity measures may be used, for example, Euclidean distance, Manhattan distance, Jaccard similarity, Pearson Correlation Coefficient, etc.

In Block 210, content embeddings of the set of relevant nodes are retrieved. Further, the content embeddings may be ranked with respect to the user query to obtain top-ranked content embeddings. In one or more embodiments, a set of relevant content embeddings corresponding to the set of relevant nodes may be retrieved from the respective nodes of the set of relevant nodes. Further, the set of relevant content embeddings may be ranked by obtaining corresponding similarity scores of respective relevant content embeddings of the set of relevant content embeddings, with respect to the user query embedding. The set of relevant content embeddings may be ranked based on the corresponding similarity scores.

As described previously, the similarity scores of the content embeddings with respect to the user query embedding may be obtained by using a similarity measure, such as cosine similarity. The set of relevant content embeddings may accordingly be reordered to reflect the rank of the relevant content embeddings with respect to the user query. For instance, the most relevant (i.e., most similar) content embedding to the user query may be a first element of the set of relevant content embeddings. The second element may be the second most relevant content embedding, and so on. Further, in certain embodiments, a top-k subset of the ranked relevant content embeddings may be down-selected from the set of relevant content embeddings. In the context of search and selection methods and functions, "top-k" refers to identifying the top k elements from a dataset based on specific criteria. For example, the top five (i.e., K=5) ranked relevant content embeddings may be selected for response generation.

In Block 212, a response to the user query is generated by the LLM using the ranked relevant content embeddings. In one or more embodiments, the search agent of FIG. 1 may prompt the LLM to generate the response using the top-k subset of the ranked relevant content embeddings. In Block 214, the response may be presented in a UI of the user application.

Figure 3:
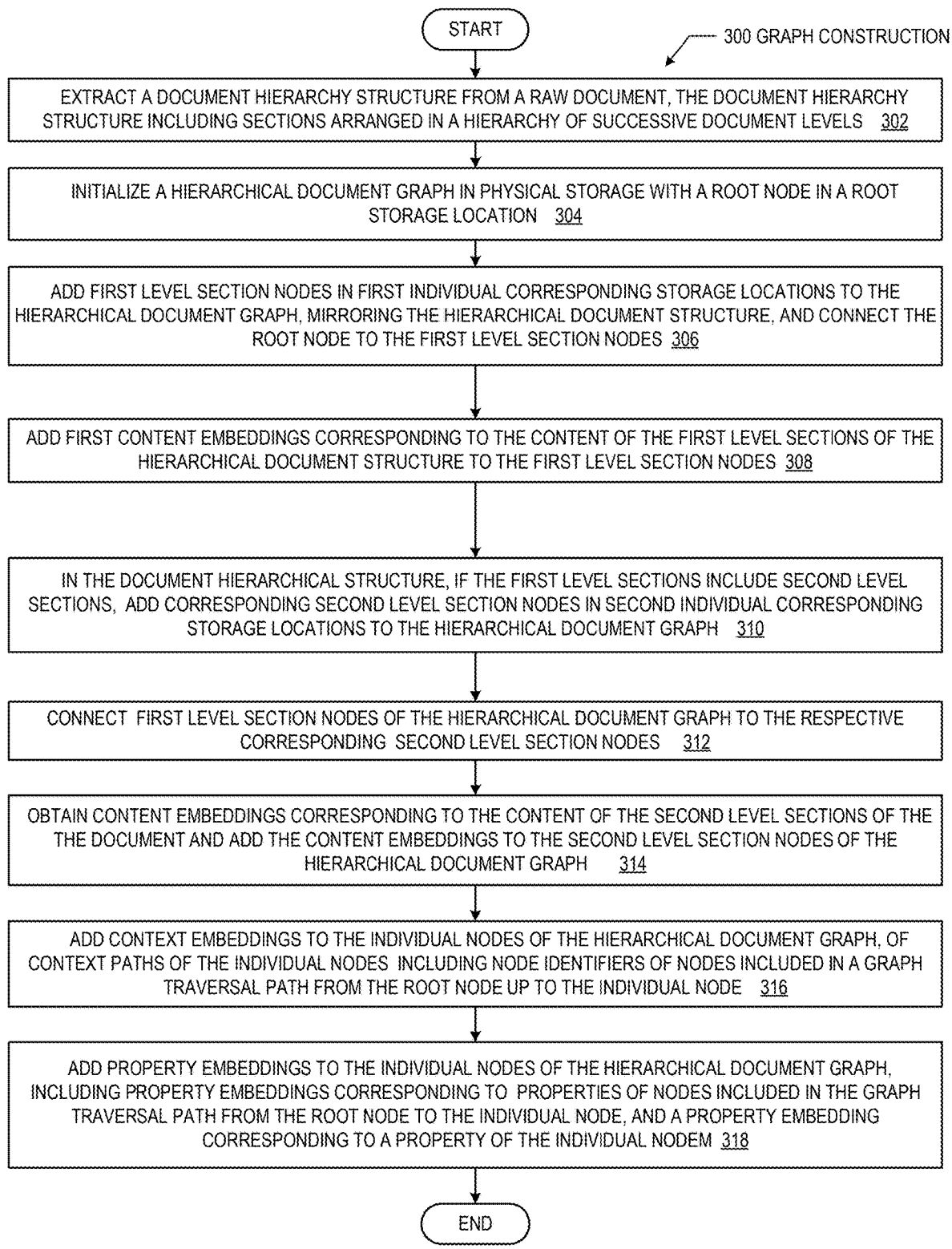
FIG. 3 shows a flowchart of a method for graph construction, in accordance with one or more embodiments.

FIG. 3 shows a flowchart 300 of a method of graph construction, in accordance with one or more embodiments. The method of FIG. 3 may be implemented using the system of FIG. 1 and one or more of the steps may be performed on or received at one or more computer processors. While the various steps in flowchart 300 are presented and described sequentially, at least some of the steps may be executed in different orders, may be combined or omitted, and at least some of the steps may be executed in parallel. Furthermore, the steps may be performed actively or passively. In one or more embodiments, the method of FIG. 3 may correspond to Block 204 of FIG. 2.

In Block 302, a document hierarchy structure may be extracted from a raw document. The document hierarchy structure may include a multitude of sections arranged in a hierarchy of successive document levels. In one or more embodiments, the document graph builder may extract the document hierarchy structure from the raw document.

In Block 304, a hierarchical document graph may be initialized in physical storage with a root node in a root storage location. The root node may include a root node identifier as the document identifier of the raw document.

In Block 306, first level section nodes in first individual corresponding storage locations may be added to the hierarchical document graph, mirroring the hierarchical document structure. The root node is connected to the first level section nodes. More particularly, the first level section nodes may correspond to respective first level sections of a first level of the hierarchical document structure. Further, the root node may be connected to the first level section nodes by adding respective first storage references corresponding to the first individual corresponding storage locations to the root node. Thus, the logical parent-child relationship between the root node and the first level section nodes are programmatically implemented in the hierarchical document graph.

In Block 308, first content embeddings corresponding to the content of the first level sections may be obtained. Further, the first content embeddings may be added to the first level section nodes. As described in reference to Block 306, the first content embeddings may correspond to content of the respective first level sections of the first level of the hierarchical document structure. The first content embeddings may be added in the first individual corresponding storage locations. In one or more embodiments, the embedding model of FIG. 1 may generate the first content embeddings corresponding to the content of the first level sections.

The steps of Block 310-312 may be repeated to generate additional levels of the hierarchical document graph, corresponding to the hierarchical document structure. Accordingly, in Block 310, in the document hierarchical structure, if the first level sections include second level sections, corresponding second level section nodes are added in second individual corresponding storage locations to the hierarchical document graph. More particularly, for a first level section of the document hierarchical structure, if the first level section includes second level sections of a second level of the hierarchical document structure, second level section nodes in second individual corresponding storage locations are added to the hierarchical document graph, corresponding to the respective second level sections. In one or more embodiments, responsive to the first level section including a multitude of second level sections corresponding to a second level of the document hierarchical structure, second section level nodes may be added in second individual corresponding storage locations to the hierarchical document graph. The second section level nodes may correspond to respective second level sections of the multitude of second level sections.

In Block 312, the first level section nodes of the hierarchical document graph corresponding to the first level section may be connected to the respective corresponding second level section nodes. A first level section node may be connected by adding the storage references of the second individual corresponding storage locations to the first level section node. In one or more embodiments, a first level section node of the hierarchical document graph corresponding to the first level section may be connected to the second section level nodes. The first level section node may be connected to the second level section nodes by adding respective second storage references corresponding to the second individual corresponding storage locations to the first level section node.

Thus, the step of Block 312 may be repeated for successive levels of the hierarchical document structure, generating corresponding successive levels of the hierarchical document graph.

In Block 314, content embeddings corresponding to the content of the second level sections the document may be obtained. Further, the content embeddings may be added to the second level section nodes of the hierarchical document graph. More particularly, content embeddings corresponding to the content of second level sections of individual first sections of the document may be obtained. The content embeddings may be added to corresponding second level section nodes of individual first level section nodes corresponding to the individual first sections. In one or more embodiments, second content embeddings corresponding to content of the respective second level sections of the multitude of second level sections of the first level section may be obtained. Further, the second content embeddings may be added to the second level section nodes corresponding to the respective second level sections of the first level section.

In Block 316, context embeddings to the nodes of the hierarchical document graph may be added to the individual nodes of the hierarchical document graph. A context embedding may be generated for a context path of an individual node of the hierarchical document graph. The context path may include node identifiers of nodes included in a graph traversal path from a root node of the hierarchical document graph up to the individual node. If the individual node is connected to at least one child node, the context path may further include a child node identifier of the at least one child node of the individual node. Further, the context embedding may be added to the individual node. In one or more embodiments, a context embedding of a context path of an individual node of the multitude of nodes of the hierarchical document graph may be generated. The context path may include node identifiers of nodes included in a graph traversal path from a root node of the hierarchical document graph up to the individual node. Further, the context embedding may be added to the individual node. In one or more embodiments, the graph traversal path from the root node to the individual node may include a sequence of nodes encountered in moving from the root node to the individual node along edges of the multitude of edges of the hierarchical document graph.

More particularly, in one or more embodiments, the context path may be obtained by adding a root node identifier of the root node of the hierarchical document graph to the context path. Further, responsive to the root node being connected to a first node in the graph traversal path from the root node to the individual node, and the first node not being the individual node, a first node identifier of the first node may be appended to the context path. Furthermore, responsive to the first node being the individual node, the individual node identifier may be appended to the context path. Additionally, responsive to the individual node being connected to at least one child node, a corresponding child node identifier of the at least one child node may be appended to the context path In one or more embodiments, the embedding model may generate the context path embedding from the context path.

In Block 318, property embeddings may be added to the individual nodes of the hierarchical document graph. A set of property embeddings may be generated for the individual node. The set of property embeddings may include property embeddings corresponding to properties of nodes included in the graph traversal path from the root node to the individual node. The set of property embeddings may further include a property embedding corresponding to a property of the individual node. The set of property embeddings may be added to the individual node.

Figure 4:
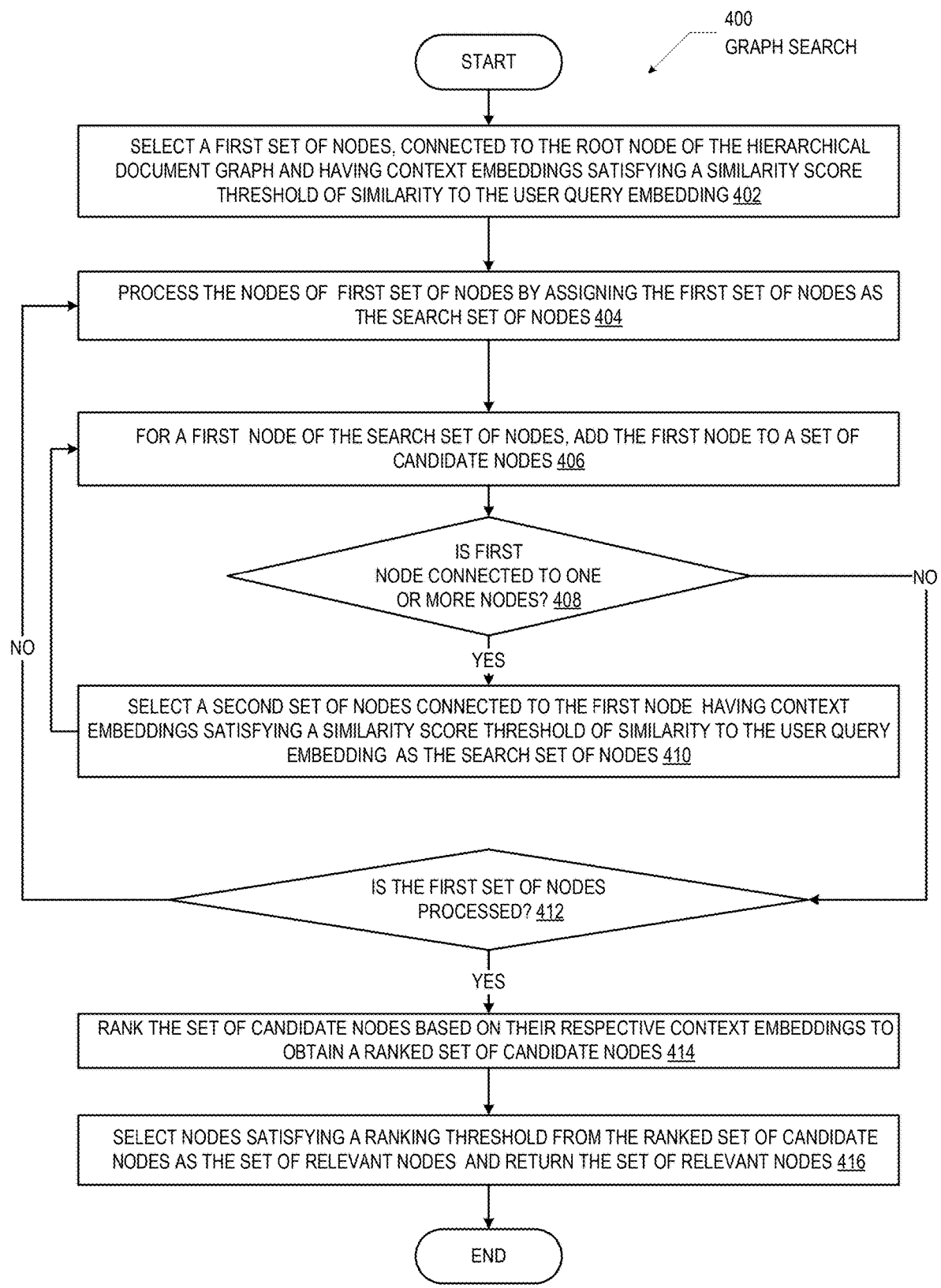
FIG. 4 shows a flowchart of a method for graph search, in accordance with one or more embodiments.

FIG. 4 shows a flowchart 400 of a method of graph search, in accordance with one or more embodiments. The method of FIG. 4 may be implemented using the system of FIG. 1 and one or more of the steps may be performed on or received at one or more computer processors. While the various steps in flowchart 400 are presented and described sequentially, at least some of the steps may be executed in different orders, may be combined or omitted, and at least some of the steps may be executed in parallel. Furthermore, the steps may be performed actively or passively. In one or more embodiments, the method of FIG. 4 may correspond to Block 208 of FIG. 2.

In Block 402, a first set of nodes may be selected. The first set of nodes may be connected to the root node of the hierarchical document graph. Further, the first set of nodes may have context embeddings satisfying a similarity score threshold of similarity to the user query embedding. In one or more embodiments, the first set of nodes may be selected as the search set of nodes for graph traversal. The similarity score threshold of similarity with respect to the user embedding may refer to a similarity measure calculated between the context embeddings of the first set of nodes and the user query embedding. For example, a cosine similarity measure may be used. In one or more embodiments, a top-k subset of the first set of nodes may be selected for processing in the hierarchical search operation. K may be a pre-defined number of nodes, configurable by the search agent. For example, K may be set to 5. In this case, the five nodes having context embeddings that satisfy the similarity score threshold, and further, the context embeddings having the top five similarity scores with respect to the user query embedding may be selected for further processing. In describing the further steps of the flowchart 400, the first set of nodes may refer to the top-k subset of the first set of nodes.

In one or more embodiments, the steps of Blocks 404-410 may be iterated to process the respective nodes of the first set of nodes. Accordingly, in Block 404, the nodes of the first set of nodes may be processed. The first set of nodes may be assigned as the search set of nodes. The search set of nodes may serve as a current set of nodes that are being searched in a particular iteration. In Block 406, a first node of the search set of nodes may be added to a set of candidate nodes. In Block 408, a check is performed to ascertain whether the first node is connected to one or more nodes. If the first node is connected to one or more nodes, control passes to Block 410. If the first node is not connected to one or more nodes, control is passed to Block 412. In Block 412, a check is performed to ascertain whether all the nodes of the first set of nodes have been processed. If all the nodes in the first set of nodes are not processed, control passes to Block 404, to continue processing of the remaining nodes of the first set of nodes.

In Block 410, a second set of nodes is selected. The second set of nodes may be connected to the first node. The second set of nodes further may respectively have context embeddings satisfying a similarity score threshold of similarity to the user query embedding. In a similar manner to down-selecting the first set of nodes, a top-k subset of the second set of nodes may be selected as the set of second nodes. The second set of nodes may be further assigned as the search set of nodes. In one or more embodiments, responsive to the first node being connected to one or more second nodes, a second set of nodes may be selected that are connected to the first node. Subsequently, control passes back to Block 406, to continue processing the search set of nodes. Thus, the "inner loop" of the flowchart 400 processes successive levels of the hierarchical document graph in a depth-first search operation. The "outer loop" of the flowchart 400 processes the first set of nodes, at the first level of the hierarchical document graph in a breadth-first search operation. If, in Block 412, it is ascertained that all the nodes of the first set of nodes are processed, control passes to Block 414.

In Block 414, the set of candidate nodes is ranked based on their respective context embeddings to obtain a ranked set of candidate nodes. In Block 416, nodes satisfying a ranking threshold are selected from the ranked set of candidate nodes as the set of relevant nodes. In one or more embodiments, responsive to the processing of the first set of nodes to obtain the candidate set of nodes, the set of candidate nodes may be ranked based on respective context embeddings of respective candidate nodes of the set of candidate nodes to obtain a ranked set of candidate nodes. Further, candidate nodes satisfying a ranking threshold from the ranked set of candidate nodes may be selected as the set of relevant nodes. In a similar manner as down-selecting the first set of nodes and the second set of nodes, the ranking threshold may be a top-k cut-off, for example, K=5.

FIG. 5 shows an example of a document hierarchical structure and a corresponding hierarchical document graph, in accordance with one or more embodiments. The following example is for explanatory purposes only and not intended to limit the scope of one or more embodiments.

Block 502 shows an example of a document hierarchical structure. The document is titled "Arctic Region Biome." At a first level of the hierarchical structure, there are two sections, titled "Part I—Flora," and "Part II—Fauna." Each of the sections is composed of (sub) sections, constituting the second level of the hierarchical structure. Thus, sections "Shrubs and Bushes," "Mammals," "Arctic Meadow Flowers" may be diverse sections at the second level. Similarly, some sections of the third level of the hierarchical structure may be "Arctic Poppy," "Herbivores," or "Carnivores." Further, a fourth level of the hierarchical structure is shown, namely, a subsection of "Carnivores," titled "Polar Bears." Block 504 shows an example of some selected content of the document titled "Arctic Region Biome." At the top level, the content includes an introduction to the document. This content may be considered as free-standing content. Similarly, the section "Part I—Flora" at the first level, is shown to include some introductory free-standing content. The section "Arctic Meadow Flowers" includes the subsections "Arctic Poppy," "Arctic Bell Heather," and "Purple Saxifrage," which provide detailed information of the arctic flowers of the document.

Figure 6:
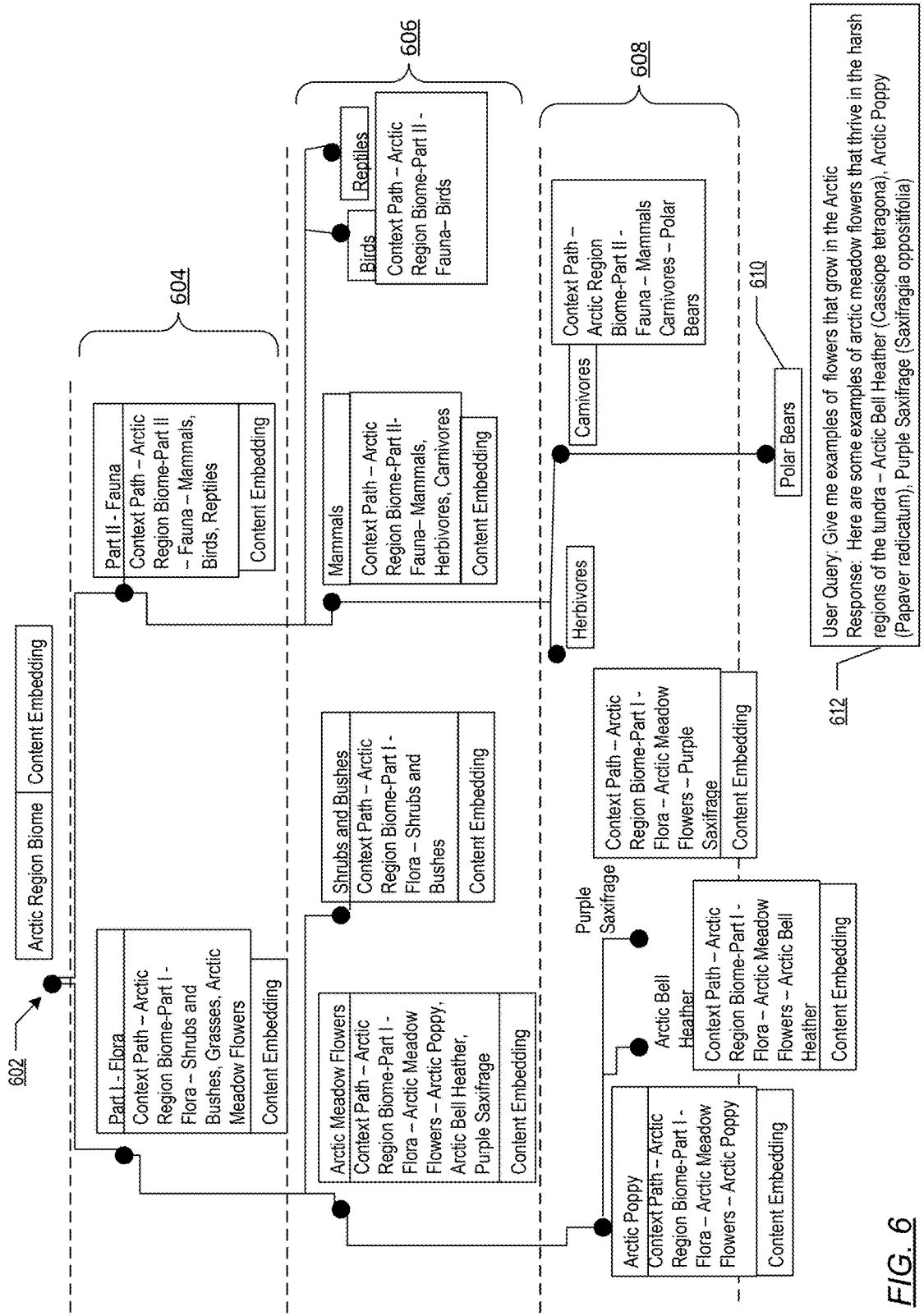
FIG. 6 shows an example of hierarchical document graph, in accordance with one or more embodiments.

The document shown in FIG. 5 may be represented by a hierarchical document graph, shown in FIG. 6. FIG. 6 shows an example of a hierarchical document graph, in accordance with one or more embodiments. Section 602 points to the root node of the hierarchical document graph. The root node identifier is the title of the document, "Arctic Region Biome." The content embedding of the root node is also shown. The content embedding may include vector representations of the free-standing content under the document title "Arctic Region Biome" shown in Block 504 of FIG. 5. Section 604 of FIG. 6 shows the nodes at the first level of the graph. The nodes of the first level are connected to nodes at the second level. Section 606 shows the nodes of the second level of the graph. The connections between the selected nodes shown mirror the parent-child logical relationships of the sections of the document hierarchical structure of Block 502. For instance, just as "Part II—Fauna" includes sections "Mammals," "Birds," and "Reptiles," in the document hierarchical structure of Block 502, the node "Part II—Fauna" in section 604 (level 1) is connected to nodes "Mammals," "Birds," and "Reptiles" in section 606 (level 2). Section 608 shows the nodes at the third level of the graph. In a similar manner, node "Mammals" in 606 (level 2) is shown as connected to nodes "Herbivores" and "Carnivores" of section 608 (level 3). Finally, 610 indicates the single node at the fourth level of the graph, namely "Polar Bears." The node "Carnivores" of section 608 (level 3) is connected to the node "Polar Bears."

Additionally, examples of context paths for selected nodes are shown in FIG. 6. For instance, in the node titled "Arctic Meadow Flowers," the context path is shown to include the node identifiers of nodes encountered in the graph traversal from "Arctic Region Biome" up to and including "Arctic Meadow Flowers." Further, the context path includes the node identifiers of the direct child nodes of "Arctic Meadow Flowers," namely, "Arctic Poppy," "Arctic Bell Heather," and "Purple Saxifrage." However, the context path of the node "Arctic Poppy" shows the node identifiers of nodes encountered in the graph traversal path from "Arctic Region Biome" up to "Arctic Poppy." "Arctic Poppy" has no direct child nodes, hence the context path for "Arctic Poppy" does not include child node identifiers. The nodes shown in the graph include content embeddings corresponding to content of the document organized under corresponding sections.

Block 612 shows an example of a user query "Give me examples of flowers that grow in the Arctic." In the graph search for context embeddings of nodes, the first node, "Part I—Flora" may have semantic similarity to the term "flowers" of the query. Further, at the first level, the node "Arctic Meadow Flowers" may have a context embedding that has a greater semantic similarity to the user query. The search agent may retrieve content embeddings from the nodes "Arctic Meadow Flowers," "Arctic Poppy," "Arctic Bell Heather," and "Purple Saxifrage." The LLM may further generate the response shown in Block 612 from the content embeddings provided.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 7A:
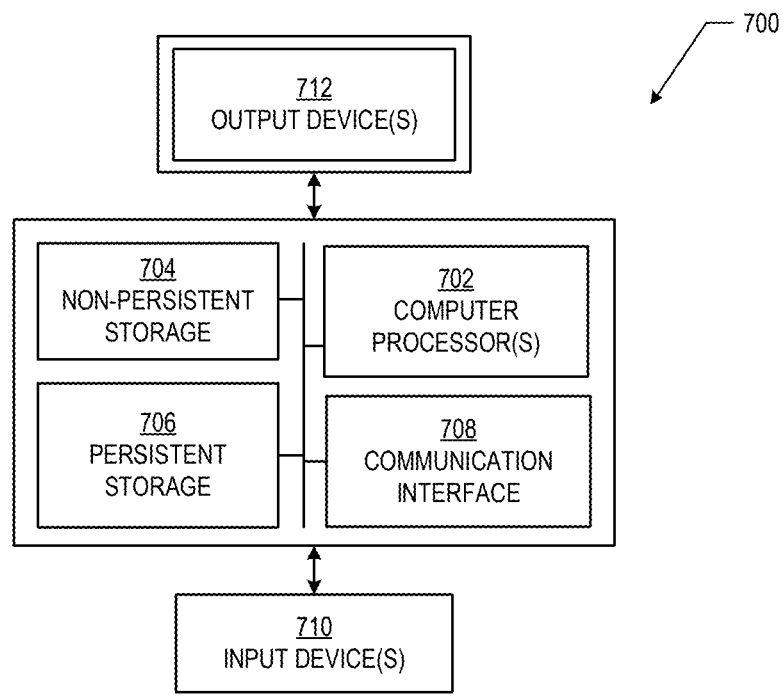
FIG. 7A and FIG. 7B show a computing system, in accordance with one or more embodiments.

For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores, or microcores, of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN), such as the Internet, mobile network, or any other type of network) or to another device, such as another computing device, and combinations thereof.

Further, the output device(s) (712) may include a display device, a printer, external storage, or any other output device. One or more of the output device(s) (712) may be the same or different from the input device(s) (710). The input device(s) (710) and output device(s) (712) may be locally or remotely connected to the computer processor(s) (702). Many different types of computing systems exist, and the aforementioned input device(s) (710) and output device(s) (712) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
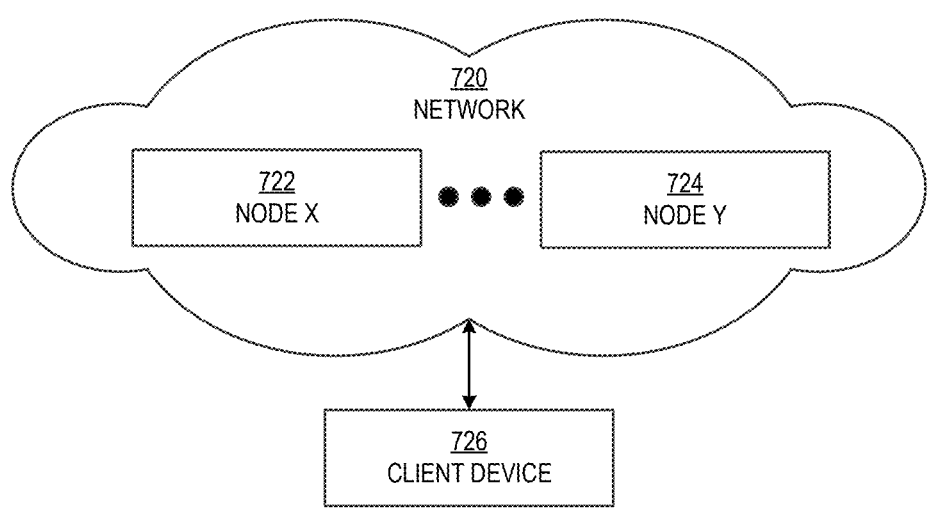

The computing system (700) in FIG. 7A may be connected to, or be a part of, a network. For example, as shown in FIG. 7B, the network (720) may include multiple nodes (e.g., node X (722) and node Y (724), as well as extant intervening nodes between node X (722) and node Y (724)).

Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726). The services may include receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof) such as results of comparisons and other processing. For example, presenting data may be accomplished through various presenting methods. Specifically, data may be presented by being displayed in a UI, transmitted to a different computing system, and stored. The UI may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   obtaining a hierarchical document structure of a raw document, the hierarchical document structure comprising a plurality of sections arranged in a hierarchy of successive document levels;
   constructing a hierarchical document graph having a graph hierarchical structure corresponding to the hierarchical document structure of the raw document in a physical storage device, comprising:
      extracting the document hierarchy structure from the raw document,
      initializing the hierarchical document graph in the physical storage device by adding a root node in a root storage location, wherein the root node comprises a root node identifier as a document identifier of the raw document,
      adding first level section nodes in first individual corresponding storage locations to the hierarchical document graph, corresponding to respective first level sections of a first level of the hierarchical document structure,
      connecting the root node to the first level section nodes by adding respective first storage references corresponding to the first individual corresponding storage locations to the root node,
      obtaining first content embeddings corresponding to content of the respective first level sections of the hierarchical document structure, and
      adding the first content embeddings to the first level section nodes corresponding to the respective first level sections of the first level of the hierarchical document structure in the first individual corresponding storage locations;
   retrieving, responsive to a user query, the hierarchical document graph corresponding to the raw document matching the user query;
   performing a hierarchical search operation on the hierarchical document graph using a user query embedding of the user query, to obtain a set of relevant nodes of the hierarchical document graph, wherein performing the hierarchical search operation comprises:
      traversing the physical storage locations of the hierarchical document graph, to select a first set of nodes, connected to a root node of the hierarchical document graph, and having first context embeddings satisfying a similarity score threshold to similarity with respect to the user query embedding, as a search set of nodes, and
      processing a first node of the search set of nodes by performing operations comprising:
         adding the first node to a set of candidate nodes, and responsive to the first node being connected to one or more second nodes,
         traversing the physical storage locations of the hierarchical document graph to select a second set of nodes, connected to the first node, and having second context embeddings satisfying a similarity score threshold of similarity with respect to the user query embedding, as the search set of nodes;
   retrieving a set of relevant content embeddings for the set of relevant nodes;
   generating, by a large language model (LLM), a response to the user query from the set of relevant content embeddings; and
   presenting the response in a user interface (UI) of a user application.

2. The method of claim 1, wherein:
   the graph hierarchical structure comprises a plurality of nodes corresponding to the plurality of sections of the raw document, interconnected by a plurality of edges, and arranged in a hierarchy of successive graph levels corresponding to the hierarchy of successive document levels,
      wherein the plurality of nodes respectively comprises a content embedding, a context embedding and a property embedding,
   the hierarchical document graph further comprises:
      a top level comprising a root node,
      at least a first level comprising one or more first nodes connected to the root node as a child node, and
      a second level comprising one or more second nodes, wherein each of the first nodes are mutually exclusively connected to the one or more second nodes as parent nodes of the second nodes.

3. The method of claim 1, further comprising:
   prior to processing the set of relevant content embeddings by the LLM, ranking the set of relevant content embeddings by performing operations comprising:
      obtaining corresponding similarity scores of respective relevant content embeddings of the set of relevant content embeddings with respect to the user query embedding, and
      ranking the set of relevant content embeddings according to the corresponding similarity scores,
   wherein the set of relevant nodes respectively comprises at least a relevant context embedding and a relevant property embedding satisfying a similarity score threshold with respect to the user query embedding.

4. The method of claim 1, wherein constructing the hierarchical document graph further comprises:
   for a first level section of the first level of the hierarchical document structure, and responsive to the first level section comprising a plurality of second level sections corresponding to a second level of the document hierarchical structure,
      adding second section level nodes in second individual corresponding storage locations to the hierarchical document graph, corresponding to respective second level sections of the plurality of second level sections;
      connecting a first level section node of the hierarchical document graph corresponding to the first level section to the second section level nodes by adding respective second storage references corresponding to the second individual corresponding storage locations to the first level section node;

obtaining second content embeddings corresponding to content of the respective second level sections of the plurality of second level sections of the first level section; and adding the second content embeddings to the second level section nodes corresponding to the respective second level sections of the first level section.

5. The method of claim 1, wherein constructing the hierarchical document graph further comprises:

adding context embeddings to a plurality of nodes of the hierarchical document graph by performing operations comprising:

generating a context embedding of a context path of an individual node of the plurality of nodes of the hierarchical document graph, wherein the context path comprises node identifiers of nodes included in a graph traversal path from a root node of the hierarchical document graph up to the individual node, and node identifiers of child nodes of the individual node, and adding the context embedding to the individual node; and adding property embeddings to the plurality of nodes of the hierarchical document graph by performing operations comprising:

generating a set of property embeddings for the individual node, comprising property embeddings corresponding to the nodes included in the graph traversal path from the root node to the individual node, and a property embedding corresponding to a property of the individual node, and adding the set of property embeddings to the individual node.

6. The method of claim 5, further comprising:

obtaining the context path by performing operations comprising:

adding a root node identifier of the root node of the hierarchical document graph to the context path, responsive to the root node being connected to a first node in the graph traversal path from the root node to the individual node, and the first node not being the individual node, appending a first node identifier of the first node to the context path, responsive to the first node being the individual node, appending an individual node identifier of the individual node to the context path, and responsive to the individual node being connected to at least one child node, appending a child node identifier corresponding to the at least one child node to the context path; and generating, by an embedding model, the context path embedding from the context path.

7. The method of claim 5, wherein the graph traversal path from the root node to the individual node comprises a sequence of nodes encountered in moving from the root node to the individual node along edges of a plurality of edges of the hierarchical document graph.

8. The method of claim 1, wherein performing the hierarchical search further comprise:

responsive to the processing the first set of nodes to obtain the set of candidate nodes, ranking the set of candidate nodes based on respective context embeddings of respective candidate nodes of the set of candidate nodes to obtain a ranked set of candidate nodes, and selecting candidate nodes satisfying a ranking threshold from the ranked set of candidate nodes as the set of relevant nodes.

9. A system comprising:

at least one computer processor;

a physical storage device;

a document graph builder, executing on the at least one computer processor, and configured to perform operations comprising:

obtaining a raw document from a data repository, having a hierarchical document structure comprising a plurality of sections arranged in a hierarchy of successive document levels, and constructing, a hierarchical document graph having a graph hierarchical structure corresponding to the hierarchical document structure of the raw document, in the physical storage device, comprising:

extracting the document hierarchy structure from the raw document, initializing the hierarchical document graph in the physical storage device by adding a root node in a root storage location, wherein the root node comprises a root node identifier as a document identifier of the raw document, adding first level section nodes in first individual corresponding storage locations to the hierarchical document graph, corresponding to respective first level sections of a first level of the hierarchical document structure, connecting the root node to the first level section nodes by adding respective first storage references corresponding to the first individual corresponding storage locations to the root node, obtaining first content embeddings corresponding to content of the respective first level sections of the hierarchical document structure, and adding the first content embeddings to the first level section nodes corresponding to the respective first level sections of the first level of the hierarchical document structure in the first individual corresponding storage locations;

a document retriever executing on at least one computer processor and configured to retrieve at least one hierarchical document graph corresponding to at least one raw document matching a semantic intent of a user query;

a search agent, executing on the at least one computer processor and configured to perform a hierarchical search operation on the at least one hierarchical document graph of a user query embedding of the user query, the hierarchical search operation comprising:

traversing the physical storage locations of the hierarchical document graph, to select a first set of nodes, connected to a root node of the hierarchical document graph, and having first context embeddings satisfying a similarity score threshold to similarity with respect to the user query embedding, as a search set of nodes, and processing a first node of the search set of nodes by performing operations comprising:

adding the first node to a set of candidate nodes, and responsive to the first node being connected to one or more second nodes, traversing the physical storage locations of the hierarchical document graph to select a second set of nodes, connected to the first node, and having second context embeddings satisfying a similarity score threshold of similarity with respect to the user query embedding, as the search set of nodes,
to obtain a set of relevant nodes of the at least one hierarchical document graph;
an embedding model, executing on the at least one computer processor and configured to generate a set of relevant content embeddings corresponding to the set of relevant nodes; and
an LLM, executing on the at least one computer processor, and configured for generating a response to the user query from the set of relevant content embeddings; and
presenting the response in a user interface of a user application.

10. The system of claim 9, wherein:
the graph hierarchical structure comprises a plurality of nodes corresponding to the plurality of sections of the raw document, interconnected by a plurality of edges, and arranged in a hierarchy of successive graph levels corresponding to the hierarchy of successive document levels, and
wherein the plurality of nodes respectively comprises a content embedding, a context embedding and a property embedding.

11. The system of claim 10, further configured for:
adding context embeddings to the plurality of nodes of the hierarchical document graph by performing operations comprising:
generating a context embedding of a context path of an individual node of the plurality of nodes of the hierarchical document graph, wherein the context path comprises node identifiers of nodes included in a graph traversal path from a root node of the hierarchical document graph up to the individual node, and
adding the context embedding to the individual node; and
adding property embeddings to the plurality of nodes of the hierarchical document graph by performing operations comprising:
generating a set of property embeddings for the individual node, comprising property embeddings corresponding to the nodes included in the graph traversal path from the root node to the individual node, and a property embedding corresponding to a property of the individual node, and
adding the set of property embeddings to the individual node.

12. The system of claim 11, further configured for:
obtaining the context path by performing operations comprising:
adding a root node identifier of the root node of the hierarchical document graph to the context path,
responsive to the root node being connected to a first node in the graph traversal path from the root node to the individual node, and the first node not being the individual node, appending a first node identifier of the first node to the context path,
responsive to the first node being the individual node, appending an individual node identifier of the individual node to the context path, and
responsive to the individual node being connected to at least one child node, appending a child node identifier corresponding to the at least one child node to the context path, and
generating, by an embedding model, the context path embedding from the context path.

13. The system of claim 11, wherein the graph traversal path from the root node to the individual node comprises a sequence of nodes encountered in moving from the root node to the individual node along edges of the plurality of edges of the hierarchical document graph.

14. The system of claim 9, wherein:
the set of relevant nodes respectively includes at least a relevant context embedding and a relevant property embeddings satisfying a similarity score threshold with respect to the user query embedding, and
wherein the system is further configured for:
for a first level section of the first level of the hierarchical document structure, and responsive to the first level section comprising a plurality of second level sections corresponding to a second level of the document hierarchical structure,
adding second section level nodes in second individual corresponding storage locations to the hierarchical document graph, corresponding to respective second level sections of the plurality of second level sections,
connecting a first level section node of the hierarchical document graph corresponding to the first level section to the second section level nodes hv adding respective second storage references corresponding to the second individual corresponding storage locations to the first level section node,
obtaining second content embeddings corresponding to content of the respective second level sections of the plurality of second level sections of the first level section, and
adding the second content embeddings to the second level section nodes corresponding to the respective second level sections of the first level section.

15. The system of claim 9, further configured for:
responsive to the processing the first set of nodes to obtain the set of candidate nodes,
ranking the set of candidate nodes based on respective context embeddings of respective candidate nodes of the set of candidate nodes to obtain a ranked set of candidate nodes; and
selecting candidate nodes satisfying a ranking threshold from the ranked set of candidate nodes as the set of relevant nodes.

16. A method comprising:
obtaining a raw document from a data repository, having a hierarchical document structure, the hierarchical document structure comprising a plurality of sections arranged in a hierarchy of successive document levels;
extracting the document hierarchy structure from the raw document;
initializing a hierarchical document graph in a physical storage device by adding a root node in a root storage location, wherein the root node comprises a root node identifier as a document identifier of the raw document;
adding first level section nodes in first individual corresponding storage locations to the hierarchical document graph, corresponding to respective first level sections of a first level of the hierarchical document structure;
connecting the root node to the first level section nodes by adding respective first storage references corresponding to the first individual corresponding storage locations to the root node;
responsive to a first level section of the first level of the hierarchical document structure comprising a plurality of second level sections corresponding to a second level of the document hierarchical structure, adding second section level nodes in second individual corresponding storage locations to the hierarchical document graph, corresponding to respective second level sections of the plurality of second level sections, and connecting a first level section node of the hierarchical document graph corresponding to the first level section to the second section level nodes by adding respective second storage references corresponding to the second individual corresponding storage locations to the first level section node;

adding context embeddings to a plurality of nodes of the hierarchical document graph by:

generating a context embedding of a context path of an individual node of the plurality of nodes of the hierarchical document graph, wherein the context path comprises node identifiers of nodes included in a graph traversal path from a root node of the hierarchical document graph up to the individual node, and node identifiers of child nodes of the individual node, and adding the context embedding to the individual node;

adding property embeddings to the plurality of nodes of the hierarchical document graph by:

generating a set of property embeddings for the individual node, comprising property embeddings corresponding to the nodes included in the graph traversal path from the root node to the individual node, and a property embedding corresponding to a property of the individual node, and adding the set of property embeddings to the individual nodes;

obtaining first content embeddings corresponding to content of the respective first level sections of the first level of the hierarchical document structure;

adding the first content embeddings to the first level section nodes corresponding to the respective first level sections of the first level of the hierarchical document structure in the first individual corresponding storage locations;

responsive to the first level section of the first level of the hierarchical document structure comprising the plurality of second level sections corresponding to the second level of the document hierarchical structure, obtaining second content embeddings corresponding to content of the second level sections of the plurality of second level sections of the first level section, and adding the second content embeddings to the second level section nodes corresponding to the second level sections of the plurality of second level sections of the first level section.

* * * * *